United States Patent
Davison et al.

(10) Patent No.: US 12,233,591 B2
(45) Date of Patent: Feb. 25, 2025

(54) APPARATUS FOR SLIP AND WEDGE SYSTEMS

(71) Applicant: TALLY PRODUCTION SYSTEMS, LLC, Houston, TX (US)

(72) Inventors: Douglas Davison, Canyon Lake, TX (US); Chad Picciotti, Spring, TX (US)

(73) Assignee: Tally Production Systems, LLC, Houston, TX (US)

( * ) Notice: Subject to any disclaimer, the term of this patent is extended or adjusted under 35 U.S.C. 154(b) by 0 days.

(21) Appl. No.: 17/899,813

(22) Filed: Aug. 31, 2022

(65) Prior Publication Data
US 2023/0064297 A1    Mar. 2, 2023

Related U.S. Application Data

(60) Provisional application No. 63/239,090, filed on Aug. 31, 2021.

(51) Int. Cl.
| | |
|---|---|
| *E21B 33/129* | (2006.01) |
| *B29C 53/56* | (2006.01) |
| *B29C 53/80* | (2006.01) |
| *B29C 70/30* | (2006.01) |
| *B29C 70/54* | (2006.01) |
| *E21B 23/01* | (2006.01) |
| *B29K 309/08* | (2006.01) |

(52) U.S. Cl.
CPC .......... *B29C 53/56* (2013.01); *B29C 53/8091* (2013.01); *B29C 70/30* (2013.01); *B29C 70/545* (2013.01); *E21B 23/01* (2013.01); *E21B 33/1293* (2013.01); *B29K 2309/08* (2013.01)

(58) Field of Classification Search
CPC .......................... E21B 33/1293; E21B 33/1292
See application file for complete search history.

(56) References Cited

U.S. PATENT DOCUMENTS

| | | | | |
|---|---|---|---|---|
| 3,506,067 | A * | 4/1970 | Lebourg | E21B 23/06 |
| | | | | 166/134 |
| 6,578,633 | B2 * | 6/2003 | Slup | E21B 33/1204 |
| | | | | 166/134 |
| 2014/0020911 | A1 * | 1/2014 | Martinez | E21B 33/129 |
| | | | | 166/134 |

FOREIGN PATENT DOCUMENTS

WO    WO-2011015835 A1 *   2/2011   ......... E21B 33/1204

* cited by examiner

*Primary Examiner* — Cathleen R Hutchins
*Assistant Examiner* — Ronald R Runyan
(74) *Attorney, Agent, or Firm* — Park, Vaughan, Fleming & Dowler LLP (57) ABSTRACT

Embodiments presented provide for a method of making as well as an apparatus for holding a hydraulic fracturing plug in a desired position within a wellbore. The hydraulic fracturing plug is configured with a slip and wedge system to maintain the desired position within the wellbore.

4 Claims, 4 Drawing Sheets

APPARATUS FOR SLIP AND WEDGE SYSTEMS

CROSS-REFERENCE TO RELATED APPLICATIONS

The present application is a nonprovisional application which claims priority to U.S. Provisional Application 63/239,090 dated Aug. 31, 2021, the entirety of which is incorporated by reference.

FIELD OF THE DISCLOSURE

Aspects of the disclosure relate to methods of manufacturing as well as an apparatus related to a slip and wedge system for downhole apparatus. More specifically, aspects of the disclosure relate to methods of manufacturing and apparatus for slip and wedge configurations for downhole hydraulic fracturing plugs used in hydrocarbon recovery projects.

BACKGROUND

Downhole systems, such as hydraulic fracturing plugs, commonly use a slip and wedge system to anchor the downhole system into a desired zone in a wellbore. The slip and wedge systems for conventional apparatus have a series of independent wedges that will contact a series of independent slips. The independent wedges force the slips to expand such that the slips contact the inside periphery of a wellbore as the wedges are forced out during activation. This action is accomplished during a process known as "setting". After lowering the hydraulic fracturing plug to an elevation that is required to be plugged, operators actuate or "set" a hydraulic fracturing plug such that the slips systems contact the inside of the wellbore, preventing slippage and movement of the plug. The installation of the plug prevents material flow past the plug. Plugs are generally installed such that anticipated fluid flow characteristics are interrupted by the plug. Such fluid flow characteristics include an anticipated pressure that may be exerted within the well during pressurization from a hydraulic fracturing operation. Such pressures may be in excess of 15,000 pounds per square inch.

While conventional apparatus with multiple piece slip and wedge systems are known, there are many problems that operators have using such conventional apparatus. First, the multiple piece anchoring systems are prone to failure. There is little uniformity in the way the independent slips and wedges operate, therefore one independent slip and wedge may function properly, while a second independent slip and wedge system may bind or be prevented from movement. The result of this haphazard type of system is a plug that may be anchored on some sides and not on others. This can lead to unequal loads on the wellbore structure and/or the plug. The result of this type of unequal loading is potential slippage or a structurally degraded plug.

As will be understood, slippage of a plug can cause significant delay or economic damage to a hydrocarbon recovery project. Such slippage can result in the hydraulic fracturing plug moving, resulting in a different isolation well portion during hydraulic fracturing. In most cases, during such movement, the portion of the well undergoing hydraulically fracturing becomes different in scope than originally planned. The differential volume results in hydraulic fracturing pressures being substantially different from engineered levels, resulting in an incomplete or inaccurate hydraulic fracturing. While such an incomplete fracturing may not be noticed at first, over time, the limited depth of the hydraulic fracturing will cause the well to not fully produce expected hydrocarbons. As a result, the well may be economically unviable early in its lifetime.

Hydraulic fracturing plugs are used in shale formations, generally, because of the abundance of hydrocarbons that may be withdrawn and the fact that these formations are readily accessible to operators. Generally, however, the wells are short lived compared to other more conventional wells. In order to make such wellbores economically viable due to their short lives, cost constraints are imposed on each well to ensure that the overall economics of the project are ensured. As hydraulic fracturing plugs are disposable equipment, there is a desire in the industry to minimize the ultimate cost of each hydraulic fracturing plug. As hydraulic fracturing plugs are destroyed during a drill out procedure, the plugs are of minimal value once hydraulic fracturing is complete.

Each conventional hydraulic fracturing plug is made of independent pieces assembled together into a single unit and the amount of time that is used to assemble such apparatus can increase the overall cost of the hydraulic fracturing plug. Such assembly can lead to human error as there are multiple steps required for assembling the hydraulic fracturing plug.

There is a need to provide a slip and wedge system to allow for accurate placement and retention of the hydraulic fracturing plug within a wellbore.

There is a further need to provide a slip and wedge system that is economical to produce to limit the cost of capital expenditure in a well.

There is a further need to provide a slip and wedge system that will provide resistance to the harsh environment experienced by hydraulic fracturing plugs.

There is a still further need to provide a slip and wedge system that can be manufactured without the need for excessive human interaction, thereby driving down the overall cost of the hydraulic fracturing plug and eliminating human error in assembly.

There is a still further need to provide a slip and wedge system that may be used in hydraulic fracturing plugs that may be drilled out with relative ease during removal procedures.

There is a further need to provide a method for manufacturing slip and wedge systems as well as the slip and wedge systems themselves that are simple to manufacture and easily understood by fabricators and operators.

There is also a further need to provide methods for manufacturing slip and wedge systems that are of high quality so the number of defects present in final pieces are minimal.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of making a slip and wedge system is disclosed. The method may comprise providing a filament winding machine. The method may also comprise providing one of a blank and a spool on the filament winding machine. The method may also provide for winding a filament on to one of the blank and the spool using the filament winding machine to produce the slip and wedge system, wherein the slip and wedge systems are one piece. The method may also provide for curing the slip and wedge system.

In one example embodiment, an apparatus is described. In this embodiment, the apparatus is configured with a slip and wedge system wherein in a first configuration each slip and each wedge are configured in a single body and wherein, upon an external force, the slip and wedge system is actuated and the each slip is separated from a corresponding wedge and wherein the each slip and the each wedge interface such that the each slip increases in diameter as the each slip travels along the each wedge.

In one example embodiment, an apparatus is described. In this embodiment, the apparatus is configured to comprise a slip and wedge system configured as a unit, wherein upon an actuation force, a series of slips separates from a connecting series of wedges and wherein the series of slips interacts with the series of wedges wherein a portion of each of the series of wedges forces a corresponding portion of each of the series of slips to an extended position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure provide a slip and wedge system for a downhole tool. Such a downhole tool may be, for example, a hydraulic fracturing plug used in hydrocarbon recovery operations. Aspects of the disclosure also provide for a method of manufacturing the slip and wedge system for the hydraulic fracturing plug. Embodiments provide for a system that may be manufactured on a composite material winding machine. In embodiments, a filament may be used. In embodiments the machine may use a fiber reinforced material, such as a fiberglass or other material. The machine may wind material to form the components and base of the slip and wedge system. As will be understood, the slip and wedge system may be constructed as a single system, different than conventional systems. As a single system, bodies of the slip and wedges may be constructed at the same time on a single machine, significantly different than conventional apparatus. In the embodiments illustrated, aspects of the slip and wedge system are manufactured together as a single part, wherein the inner diameter of the slip and wedge system is completed during the winding process based upon the winding method used. In other example embodiments, the inner diameter ("ID") may be machined to achieve a desired inner diameter. The outer diameter ("OD") of the slip and wedge system may be machined to achieve a desired outer diameter size and profile. The machining may include, for example, creating slots between the individual slips. Embodiments provided allow for a final form of the slip and wedge system that may be used within a wellbore and release/deploy the slips upon a predetermined setting force. In other embodiments, a multi-step process may be used. For example, addition of other components, such as friction buttons on the slips may occur. These components may be made of metal, such as carbon steel, as a non-limiting embodiment.

Figure 1:
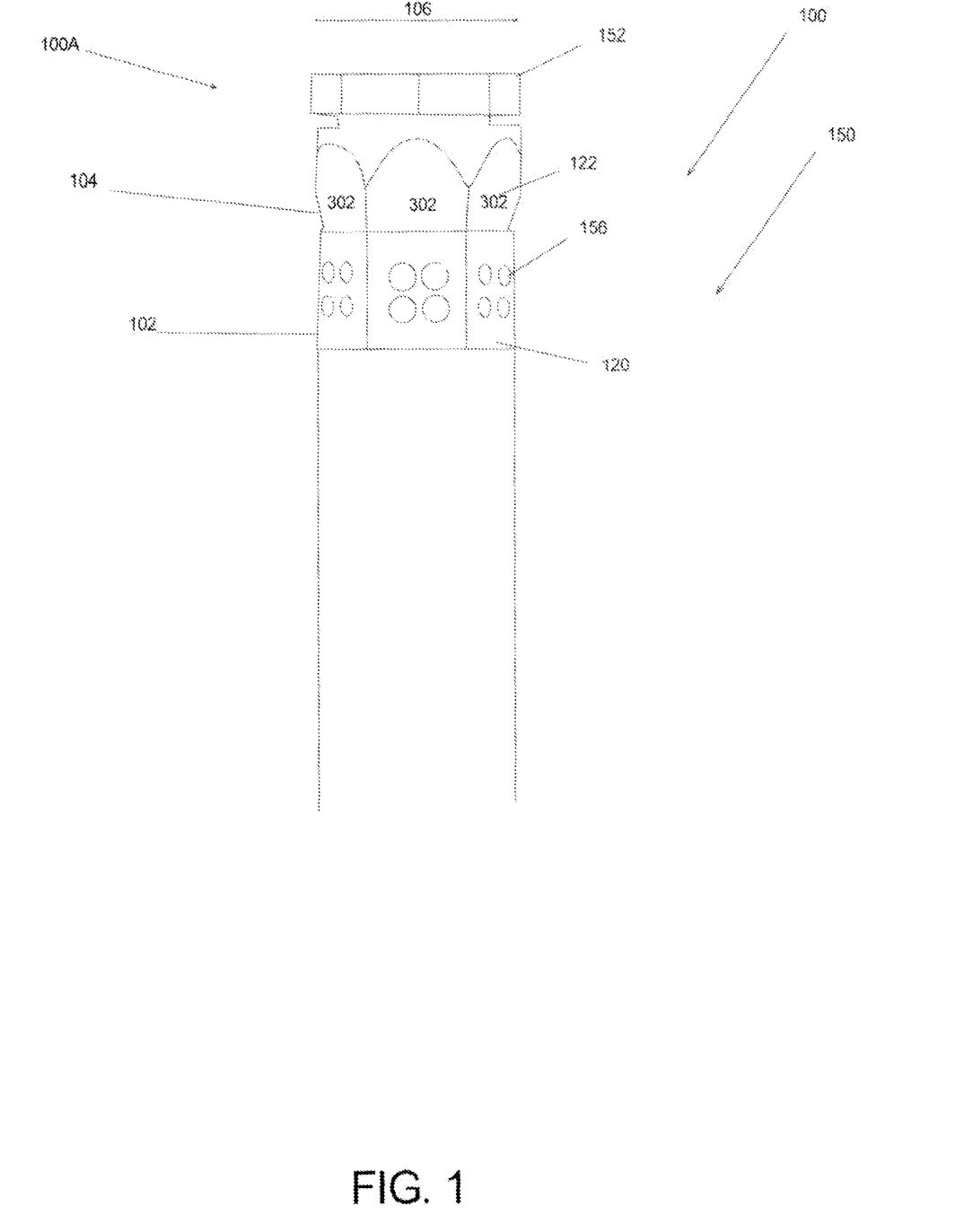
FIG. 1 is a side elevational view of a slip and wedge system in accordance with one example embodiment of the disclosure.

Referring to FIG. 1, a side elevational view of a slip and wedge system 100 is illustrated. The slip and wedge system 100 is manufactured through a filament winding system. Aspects of the methods used to manufacture the slip and wedge system 100 are described in relation to FIG. 4. The slip and wedge system 100 may be configured with a number of slips 102 and a number of wedges 104. The number of slips 102 may equal the number of wedges 104. In one example embodiment, the number of slips 102 may be six and the number of wedges 104 may be six. Other configurations are possible. Such non-limiting numbers of slips and wedges may be two (2) through ten (10). As will be understood, the external diameter 106 of the slip and wedge system 100 may be varied to fit the slip and wedge system 100 within various size requirements for the tool to be able to fit within a defined wellbore.

In the side elevational view of the slip and wedge system 100, an upper portion 100A and a lower portion (which can be a reverse image of upper portion 100A) provide two discrete sections for contacting an interior surface of the well bore. Such upper portion 100A is shown as a component of a hydraulic fracturing plug 150. As illustrated, the hydraulic fracturing plug 150 has an upper end 152. The upper end 152 is provided with a contact surface 156. As illustrated, the contact surface 156 is configured with a jagged edge surface to interface with an internal diameter of the wellbore casing. The contact surface 156 provides for engagement with the casing internal diameter and subsequent motion of the slip and wedge system 100. The lower end is also provided with a contact surface 156 that may also be used to interface with the internal diameter of the wellbore casing.

In embodiments, when the setting tool is activated downhole, compression of the components will allow for the slip and wedge system 100 to break from a unset position to a set position by allowing the contact surface 156 to contact the wellbore casing wall. During manufacturing of the slip and wedge system 100, construction is achieved through winding of a filament or filaments forming a unit. Upon actuation of the setting tool causing the unit to move toward a set position, the individual slips 120 will become mobile from the wedges 122 and move along the wedge surfaces 302, described later, thereby causing the slips 120 to move in an outward direction. This expands the overall diameter of the hydraulic fracturing plug 150, thereby allowing the slips 120 to contact the interior surface of the wellbore. In one example embodiment, the winding of the filament or filaments occurs such that the filament(s) are wound around a specific shape on the filament winding machine. Such a winding forms a desired inner diameter of the entire system. In a case of a complex geometry, the inside mandrel upon which the filament(s) are wound may be a segmented mandrel or may be an expandable/contractable mandrel to allow removal of the winding from the mandrel. In the next step, the slip and wedge system may be machined into the outside of the winding previously performed. The machining can take several forms, including grinding, cutting, abrasive (media) blasting or other forming techniques. The amount of the machining on the outside of the winding will determine the amount of force that will cause the overall portions of the slips 120 and wedges 122 to separate and actuate. As will be understood, deep machine forming of grooves in the slips 120 may allow the slips 120 to separate from the rest of the hydraulic fracturing plug 150 at a lower setting force. Greater amounts of material that remain between the slips 120, however, will require a greater force to be exerted and ultimately used to shear the slips 120 allow for movement of the slips 120 along the wedges 122. During the setting process, when parts are compressed, the slips 120 shear away and ride up the associated wedges 122, ultimately biting into the casing.

Figure 2:
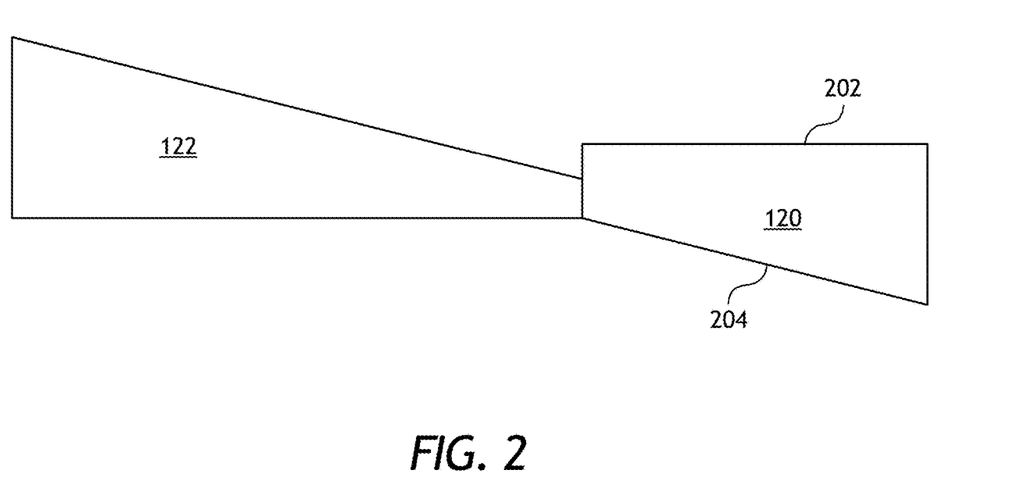
FIG. 2 is a side elevational view of a slip of the slip and wedge system of FIG. 1.

Referring to FIG. 2, a portion of a slip 120 and a wedge 122 is illustrated in their embodiment (also shown in FIG. 1) where they have yet to be separated/activated in a well bore. Referring back to FIG. 1, each slip 120 has a width extending from a right side to a left side of each slip 120. As shown in both FIG. 1 and FIG. 2, each slip 120 also has a length extending from an upper end (i.e., the edge of slip 120 where slip 120 meets a lower end of wedge 122) and a lower end (i.e., the edge of slip 120 opposite its upper end). As also shown in FIG. 2, each slip 120 is provided with an exterior surface 202 and an interior surface 204, where the distance between the exterior surface 202 and interior surface 204 forms the depth of each slip. The interior surface 204 is configured to move across a mating surface of a wedge 122, described in relation to FIG. 3, when/after the slip 120 and wedge 122 have been separated/activated in a well bore. The slip 120 provides for the gripping surface between the hydraulic fracturing plug 150 and the interior of the wellbore, such as the wellbore casing. The slip 120 may be provided with a single button or a series of buttons on the exterior surface of the slip 120. In one embodiment, each of the buttons used may be mechanically attached to the slip 120 through various connection technology. Each stud may be made of metal, such as carbon steel. Other configurations may use carbon diamond impregnated arrangements or other types of materials such as ceramic.

In some embodiments, the interior surface 204 is configured as a smooth surface to allow of sliding capability between the slip 120 and the adjacent wedge 122. Other configurations may use a graduated surface with notches. Such a configuration would interact, in one embodiment, with a similar configured notched surface in the adjacent wedge 122. In this embodiment, for example, the notched configuration would prevent deflation or decrease in exterior diameter as interfacing notches would prevent movement back to a previous position. Such a configuration would be used in a single application setting where repositioning of the hydraulic fracturing plug 150 is not required.

Figure 3:
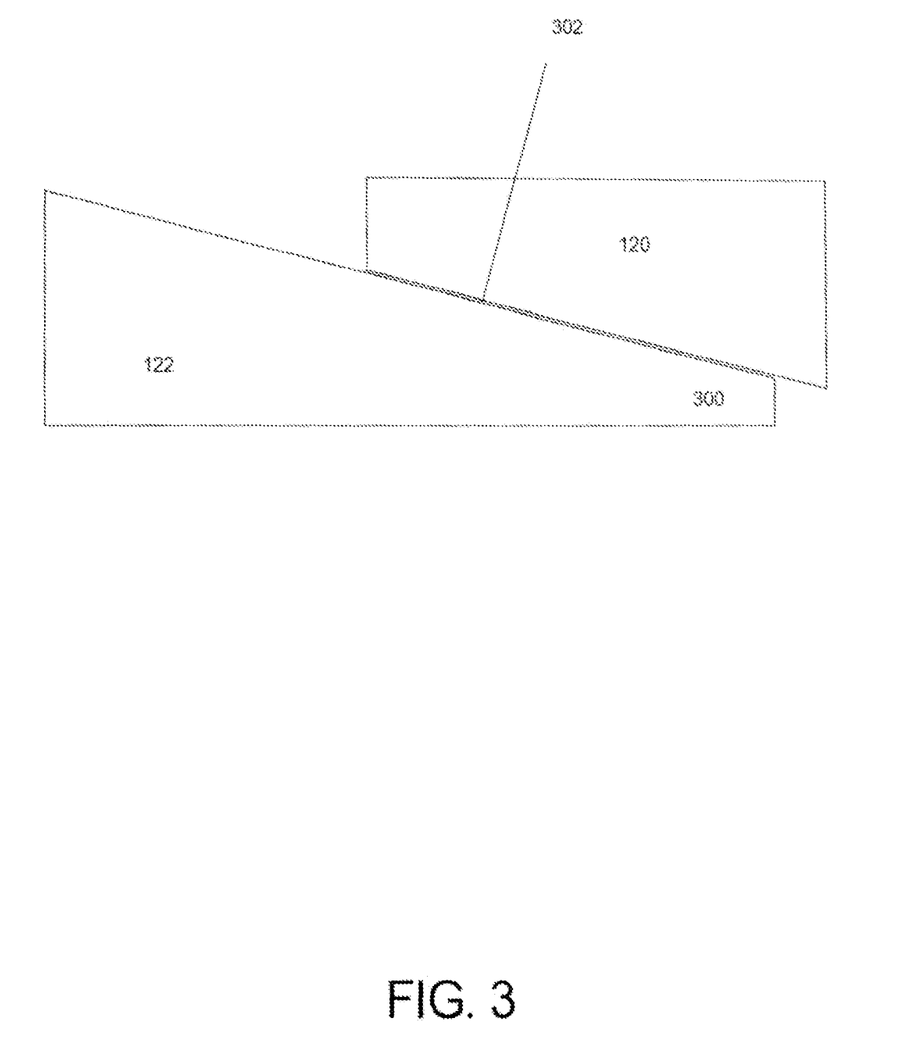
FIG. 3 is a side elevational view of the wedge of the slip and wedge system of FIG. 1.

Referring to FIG. 3, a portion of a wedge 122 is illustrated. The wedge 122 is configured to contact the slip 120 and force the slip 120 to expand outward from a central axis of the hydraulic fracturing plug 150. To this end, the wedge 122 is provided with an angle 300. The amount of the angle 300 is configured to extend the slips 120 to a greater overall extension from the central axis or a lesser amount when provided with a smaller angle. The wedge 122 is configured from a material and is formed at the same time as the slips 120. This configuration is provided as a unit and FIG. 3 illustrates one portion of the unit. Upon a setting force, the slips 120 and the wedge 122 separate and the slips 120 move up against the wedge 122, eventually reaching the edge of the wedge 122. The surface 302 of the wedge 122 may be a plane or may be cupped as a semi-circle, an ellipsoid or other complex shape.

In embodiments, a machine is used to manufacture the slip and wedge system 100. One such embodiment may use a CNC fiberglass winding machine that winds a material, such as a fiberglass, over a blank. In other embodiments, the winding may occur over a spool piece with composite material accumulating on selected exterior areas to create a desired exterior surface. During winding, a computer may control the placement of composite material to make the slip and wedge system. During placement of the material, a separate application of resin may also occur. The placement of resin may be performed through a computer-controlled application or by operator interaction. In other embodiments, the resin may be sprayed on during the layering of the material or may be added after winding. In other configurations, the finished unit may be placed in a curing bath.

In some embodiments, instead of a spool piece being used, a mandrel may be used to create the internal diameter of the slip and wedge system 100. In these embodiments, the mandrel may be configured such that the mandrel allows for a greater or lesser diameter product. Thus, the use of an expandable mandrel can augment manufacturing of larger or smaller sizes of plugs on a single machine. Such variability can allow for the production of many different size plugs. In some embodiments, the plug sizes can range from 2 inch exterior diameter to 10 inch exterior diameter.

To aid in the placement of resin, different types of resin application may be used to achieve desired results. In one example application, resin may be sprayed directly on the wound filaments in correct portions to allow for fixation. The spraying may be achieved through use of a fixed spray gun in the case of a movable spool or mandrel system. In other embodiments, a movable spray gun may apply resin over a mandrel system that has a fixed (but rotatable) orientation. Different types of spray gun types may be used, including a gravity fed spray gun for high density mixtures, a low volume low pressure (LVLP) spray gun, a high-volume low pressure (HVLP) spray gun. In instances where a HVLP spray gun is used, a high material transfer efficiency is achieved with reduced overspray. Reduction in overspray allows for reduced material costs used during formation activities. Such reduction in overspray allows for reduction in volatile organic and chemical emittance to the environment. In instances where a LVLP gun is used, the advantages include use of a lower supply air and reduced energy costs for production compared to a HVLP spray gun.

Feeding systems may include, but not be limited to: siphon feed systems, gravity feed systems and pressure feed systems. In the guns used, needle and nozzle sizes may be changed at the requirement of engineers to change flow patterns and volumes of materials (resins) flowing from the gun.

In some embodiments, a resin spray fiberglass machine may combine the spraying of the composite material along with the application of resin. In these embodiments, the resin is atomized during the spraying process, thereby allowing proper adhesion between the fibers and resin during the formation process.

Figure 4:
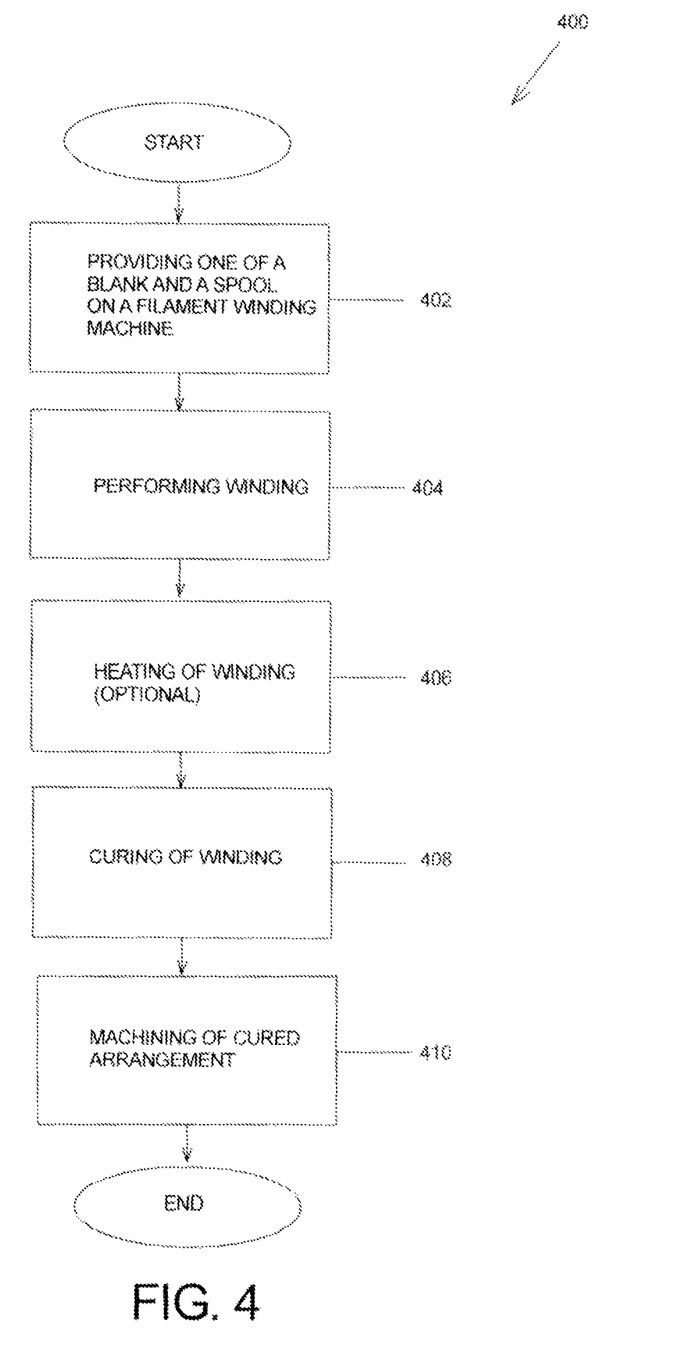
FIG. 4 is a method of making the slip and wedge system in accordance with one example embodiment of the disclosure.

Referring to FIG. 4, a method 400 of making a slip and wedge system is illustrated. The method 400 may include, at 402, providing one of a blank and a spool on a filament winding machine. At 404, the method continues for winding the one of the blank and the spool on the filament winding machine such that both a slip and a wedge of a downhole tool are formed during the winding. As will be understood, the winding at 404 may include a single filament winding or multiple filament windings. Additionally, at 404, the winding may also include the providing of resin to the placed filament winding. At 406, the winding may be accompanied with an optional heating before, during or after the winding. For ease of illustration, FIG. 4 illustrates that the heating occurs after the winding at 404. During the winding at 404 for the slip and wedge, the production of the entire unit is for a single piece slip and wedge system wherein the slips are configured to deploy at a known force. At 408, with the winding completed, the completed slip and wedge system is allowed to cure or harden. At 410, additional machining may occur for the single piece slip and wedge system to install other optional components. The additional machining may allow for placement of studs within the slips portion to allow for a high compression and wear surface between the slip and wedge system and the inner diameter of the wellbore when the slips are extended to contact the wellbore. Other machining that may occur includes creating a desired outer surface profile of the slip and wedge system. Such outer surface profile may include the creation of grooves within the slip system such that the slips will break from the wedge system and deploy under a known setting force. The machining may also include mechanically attaching materials to the slips as previously described.

Different types of filaments may be used by the filament winding machine during the method 400 disclosed in FIG. 4. Different filaments may include fiberglass, E glass, glass, aramids, carbon and boron fibers. Resins used may include, but not be limited to, epoxy, polyurethane, polyester, vinylester, phenolics, furans and polyimides. The winding process itself may be performed in a continuous or discontinuous fashion. The filament winding machine may have a two (2) axis placement capability in one example embodiment. In another example embodiment, the filament winding machine may have a three (3) axis winding capability. Control of the filament winding machine may be through a connected computer that tracks placement of the fiber, time of winding, amounts of resin used, curing temperature, ambient humidity and curing time. As will be understood, in the case of use of an expandable mandrel system, the connected computer may also expand the mandrel to the desired interior dimension prior to placement of any fibers.

During the heating steps, as described above, additional manipulation of the created unit may occur. Such manipulations may include bending or other shaping functions. In addition or instead of direct heating, curing may occur through the use of infra-red radiation to provide an even cure. In other instances, resins used may be cured through the application of ultra-violet light, therefore the heating may include the application of an ultra-violet light source. In still other instances, curing may occur through deposition of the final unit within a chemical solution.

Aspects of the disclosure provide a slip and wedge system that allows for accurate placement and retention of a hydraulic fracturing plug within a wellbore.

Further aspects of the disclosure provide a slip and wedge system that is economical to produce to limit the cost of capital expenditure in a well.

Still further aspects of the disclosure provide a slip and wedge system that will provide resistance to the harsh environment experienced by hydraulic fracturing plugs.

Aspects of the disclosure provide a slip and wedge system that can be manufactured without the need for excessive human interaction, thereby driving down the overall cost of the hydraulic fracturing plug and eliminating human error in assembly.

Aspects of the disclosure provide a method for manufacturing slip and wedge systems as well as the slip and wedge systems themselves that are simple to manufacture and easily understood by fabricators and operators.

Aspects of the disclosure provide methods for manufacturing slip and wedge systems that are of high quality so the number of defects present in final pieces are minimal.

In one example embodiment, a method of making a slip and wedge system is disclosed. The method may comprise providing a filament winding machine. The method may also comprise providing one of a blank and a spool on the filament winding machine. The method may also provide for winding a filament on to one of the blank and the spool using the filament winding machine to produce the slip and wedge system, wherein the slip and wedge systems are one piece. The method may also provide for curing the slip and wedge system.

In another example embodiment, the method may be performed wherein the filament winding machine is a multiple filament winding machine.

In another example embodiment, the method may be performed wherein the winding the filament includes placing a resin contemporaneously with the winding of the filament.

In another example embodiment, the method may be performed wherein the curing the slip and wedge system includes heating the slip and wedge system.

In another example embodiment, the method may be performed wherein the curing the slip and wedge system includes exposing the slip and wedge system to ultra-violet light.

In another example embodiment, the method may be performed wherein the curing the slip and wedge system includes exposing the slip and wedge system to infra-red radiation or a kiln.

In another example embodiment, the method may include further machining an external surface of the slip and wedge system.

In another example embodiment, the method may be performed wherein the machining the external surface includes placing at least one stud on an external surface of the slip system.

In another example embodiment, the method may be performed wherein the machining the external surface includes creating grooves between sections of the slip system.

In another example embodiment, the method may be performed wherein the filament is one of a fiber glass, an E glass, a carbon fiber and a fiber that incorporates boron.

In another example embodiment, the method may be performed wherein the winding the filament is a single filament.

In one example embodiment, an apparatus is described. In this embodiment, the apparatus is configured with a slip and wedge system wherein in a first configuration each slip and each wedge are configured in a single body and wherein, upon an external force, the slip and wedge system is actuated and the each slip is separated from a corresponding wedge and wherein the each slip and the each wedge interface such that the each slip increases in diameter as the each slip travels along the each wedge.

In one example embodiment, an apparatus is described. In this embodiment, the apparatus is configured wherein the slip and wedge system is made of a composite material.

In one example embodiment, an apparatus is described. In this embodiment, the apparatus is configured wherein the composite material is one of a fiber reinforced material and a fiberglass.

In one example, the apparatus may further comprise at least one button mechanically attached to the each slip.

In one example embodiment, an apparatus is described. In this embodiment, the apparatus is configured with a slip and wedge system as a unit, wherein upon an actuation force, a series of slips separates from a connecting series of wedges and wherein the series of slips interacts with the series of wedges wherein a portion of each of the series of wedges forces a corresponding portion of each of the series of slips to an extended position.

In one example embodiment, an apparatus is described. In this embodiment, the apparatus is configured wherein the slip and wedge system is made of a composite material.

In one example embodiment, an apparatus is described. In this embodiment, the apparatus is configured wherein the composite material is one of a fiber reinforced material and a fiberglass.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An apparatus, comprising:
a slip and wedge system including a plurality of slips and a corresponding plurality of wedges;
each of said plurality of slips includes a width extending from a right side to a left side of each slip, a length extending from an upper end to a lower end of each slip, and a depth extending from a front side to a back side of each slip;
each of said plurality of wedges includes at least a lower end;
wherein in a first configuration each slip and each wedge are configured in a single body such that the upper end of each of the plurality of slips is connected to a respective one of the lower end of the plurality of wedges, and each of the plurality of slips is positioned adjacent one another such that there is a gap between each slip extending from the lower end to the upper end of each slip and further extending throughout the entire depth of each slip so that the slips are not co-joined to each other; and
wherein, upon an external force, the slip and wedge system is actuated such that the upper end of each slip is disconnected from the lower end of its respective wedge and such that each slip and its respective wedge abut and slide along a mating surface such that each slip increases in diameter as each slip slides in a direction along the mating surface.

2. The apparatus according to claim 1, wherein the slip and wedge system is made of a composite material.

3. The apparatus according to claim 2, wherein the composite material is one of a fiber reinforced material or a fiberglass.

4. The apparatus according to claim 1 further comprising at least one stud mechanically attached to each slip.

\* \* \* \* \*